(No Model.)

H. E. PRIDMORE.
MECHANICAL MOVEMENT.

No. 325,270. Patented Sept. 1, 1885.

WITNESSES
Wm. A. Skinkle
Henry A. Lamb

INVENTOR
Henry E. Pridmore.
By his Attorneys

UNITED STATES PATENT OFFICE.

HENRY E. PRIDMORE, OF CHICAGO, ILLINOIS.

MECHANICAL MOVEMENT.

SPECIFICATION forming part of Letters Patent No. 325,270, dated September 1, 1885.

Application filed July 10, 1885. (No model.)

*To all whom it may concern:*

Be it known that I, HENRY E. PRIDMORE, of Chicago, in the county of Cook and State of Illinois, have invented certain new and useful Improvements in Mechanical Movements, of which the following is a specification.

In some classes of machinery it is desirable to impart movement to a chain or other belt which extends at an oblique angle from the driving-shaft. This is particularly true of a certain type of harvester-binders invented by me, in which the elevator shears obliquely to the rear from the delivery end of the platform, in order to bring its head behind the main wheel, and is traversed by rake-heads carried by chains at the front and rear. Such construction requires that the chains or belts shall be driven at equal speed from a horizontal shaft located either at the foot or head of the elevator-frame and parallel with the delivery end of the platform.

The object of my present invention is to afford a movement whereby such chains or belts may be driven in this and machines presenting similar exigencies from sprocket-wheels or pulleys mounted upon the driving-shaft, but turning upon an axis oblique thereto, and it will be understood from the following description.

Figure 1:
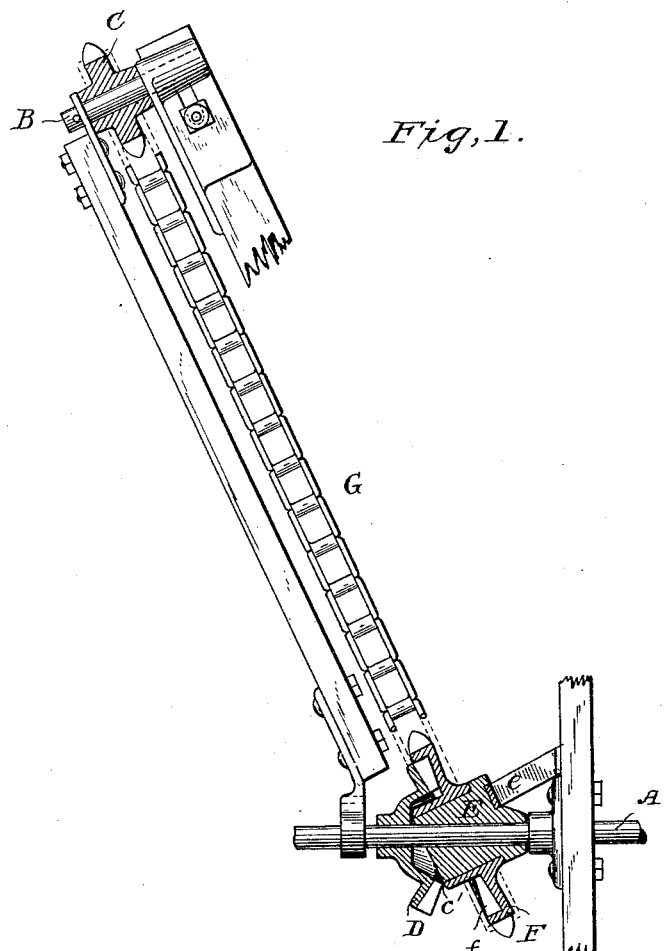
Figure 2:
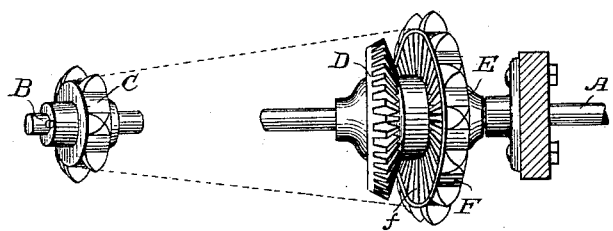

In the drawings, Figure 1 is a plan view, partly in section, of mechanism embodying my invention and applied for the purpose of communicating motion from a prime shaft to a counter-shaft or sprocket-wheel thereon having an axis oblique to the first, and Fig. 2 is a perspective view of said mechanism with part of the frame-work removed to more clearly expose the essential elements thereof.

A represents a rotating shaft, to which power is communicated in any suitable manner; and B, a counter-shaft arranged obliquely thereto, and having upon it a sprocket-wheel, C, either loose thereon if the wheel is to serve as an idler, or made fast thereto if the counter-shaft is to be driven.

Upon the prime shaft is keyed a bevel-pinion, D, and opposite the toothed face of this pinion the shaft receives and turns in a brass, E, which by means of a metal strap, $e$, is secured to the supporting timbers or frame-work, or to the bracket in which the shaft is journaled, and thereby held against rotation or movement along the shaft. The periphery of this brass is turned down on the side toward the pinion to form an oblique bearing, $c'$, the axis of which intersects the axis of the prime shaft, but is parallel with the axis of the counter-shaft. Upon this bearing is mounted loosely a sprocket-wheel, F, if a chain be used, or a pulley if a belt is to be used, the wheel on the counter-shaft of course corresponding in peripheral outline. The position of these wheels on their respective shafts will be such that their faces lie in the same plane. In the side of the wheel F is formed a beveled gear, $f$, which engages with the beveled pinion on the prime shaft, so that as said shaft turns the pinion will drive the sprocket-wheel and motion will be communicated through the chain or belt G to the wheel on the counter-shaft.

It will be understood from the foregoing description and from the references to the employment of pulleys instead of sprocket-wheels that I have described the latter simply as exponents of both, and that whenever the term "sprocket-wheel" is used in the ensuing claims it is to be taken as including a pulley as an equivalent so far as the principle of my invention is concerned.

It will also be understood that the prime shaft and counter-shaft as herein denominated may interchange functions, so that the former may be driven from the latter instead of driving it, without altering the mechanism.

I claim as my invention—

1. The combination of the rotating shaft, the bevel-pinion keyed thereto, the brass encircling said shaft and formed with an oblique peripheral bearing, and the sprocket-wheel turning loosely on said brass and formed with a bevel-gear in its face opposite to the teeth of the bevel-pinion, which gear meshes with said pinion.

2. The combination of a rotating shaft, the pinion keyed thereto, the brass encircling the shaft opposite the toothed face of said pinion and formed with an oblique peripheral bearing, the sprocket-wheel turning loosely on said bearing, and having a bevel-gear cut in its face to engage with the bevel-pinion, the oblique counter-shaft, the sprocket-wheel thereon, and the chain connecting the two sprocket-wheels.

HENRY E. PRIDMORE.

Witnesses:
PAUL ARNOLD,
JOHN THORSELL.